Dec. 19, 1944.　　　B. F. LANGER　　　2,365,564
TORQUE MEASURING DEVICE FOR SHAFTS
Filed Nov. 19, 1942
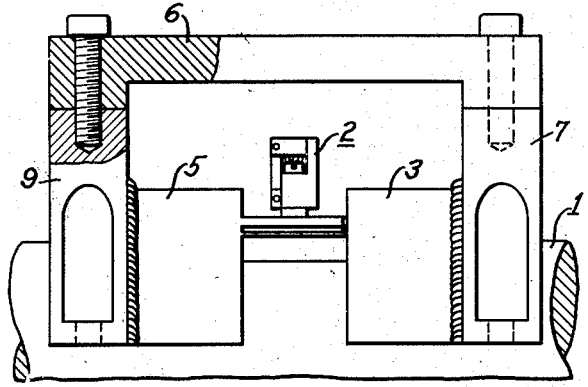
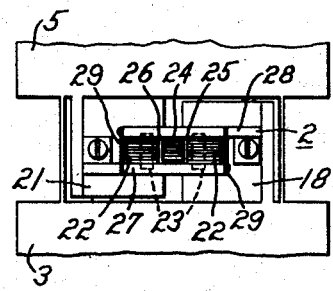
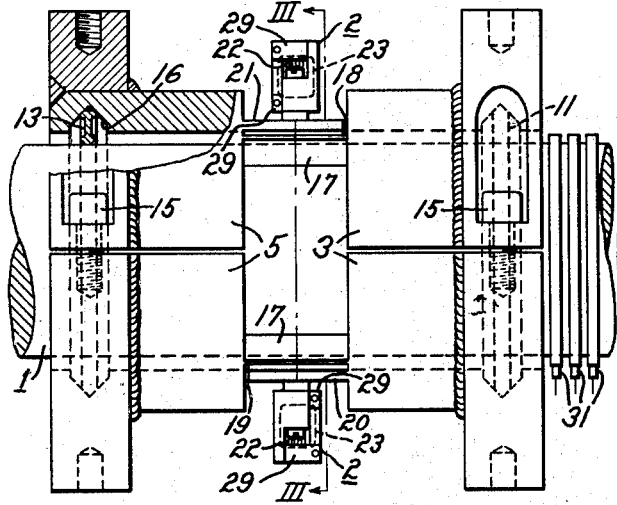
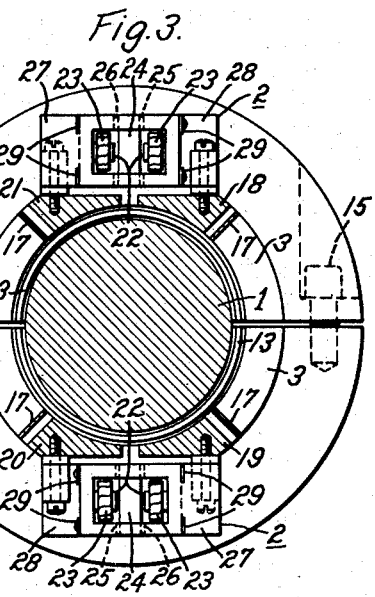
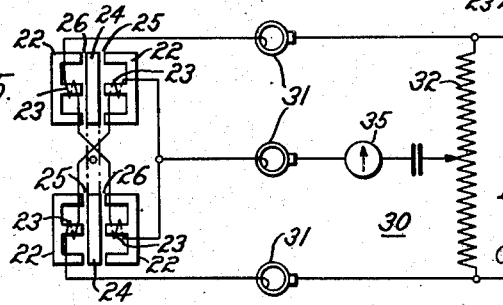
WITNESSES:
Wm. B. Sellers.
E. F. Oberheim.
INVENTOR
Bernard F. Langer
BY
Paul E. Friedemann
ATTORNEY Patented Dec. 19, 1944

2,365,564

UNITED STATES PATENT OFFICE 2,365,564

TORQUE MEASURING DEVICE FOR SHAFTS

Bernard F. Langer, Pittsburgh, Pa., assignor to Westinghouse Electric & Manufacturing Company, East Pittsburgh, Pa., a corporation of Pennsylvania Application November 19, 1942, Serial No. 466,146

3 Claims. (Cl. 73—136)

The present invention relates to apparatus for continuously indicating the torque of a shaft.

More particularly, the present invention relates to torque measuring devices such as those operable in response to the torsional deflections of a shaft.

A principal object of the present invention is to provide a torque measuring device wherein the elements secured to the shaft will effectively retain their predetermined settings over long periods of operation.

Another object of the present invention is to provide a torque measuring device which is axially split and may, therefore, be assembled about the shaft without having access to the end thereof.

Another object of the present invention is to provide means for laterally stabilizing the relatively movable rotating parts in a device of the character referred to.

Other objects and advantages will become more apparent from a study of the following specification when considered in conjunction with the accompanying drawing, in which:

Figure 1 is a view fragmentarily in section illustrating one-half of the torque measuring device positioned on the shaft;

Fig. 2 is an assembly view partially in section of the torque measuring device;

Fig. 3 is a sectional view taken on the line III—III of Fig. 2;

Fig. 4 is a fragmentary top view illustrating the interlocking relation of the axial extending sections or pads to which the magnetic strain gauge elements are mounted, and Fig. 5 is a schematic illustration of the device.

In using electrical extensometers to measure the torque being transmitted by a rotating shaft, the accuracy and reliability of the results depend to a great extent upon the mounting of the gauges. Some of the desirable qualities which a gauge mount should possess are:

(1) Flexibility to torsional deflection so that circumferential motion can be transmitted to the gauges without making the mounting clamps or supports slip on the shaft.

(2) Rigidity with regard to deflections produced by centrifugal force.

(3) The possibility of being split axially so that installation can be made without having access to the end of the shaft.

(4) A clamping length on the shaft which is small compared to the distance between clamps. If this condition is not fulfilled, the gauge length is indeterminate.

Attempts to bring in some of these desirable qualities often result in violating some of the other necessary conditions. For example, the most rigid gauge mounting would be one with a large clamping area on the shaft. This, however, prevents the gauge length from being accurately measured, since it cannot be determined in what transverse plane of the mounting surface the gauge length begins. In addition with the large clamping area, the gauge length may change from its predetermined setting during operation due to distortion or deflection of the shaft surface included in the clamping area.

In the drawing is illustrated a torque measuring device which combines various features in such a way as to include all of the above listed desirable qualities. Referring now particularly to Figure 1, there is illustrated the assembly of one-half of the torque measuring device on the shaft 1. The two halves are alike and each has mounted thereon a magnetic strain gauge 2. Thus relative movement between each of the axially spaced halves of the cylindrical members or torque rings 3 and 5 may be measured by the electrical response of the strain gauge. The rings 3 and 5 are so spaced when they are made that a known gauge length of shaft is included between the planes in which they are to be mounted on the shaft. It is essential that this gauge length be accurately maintained. For this purpose, and also to facilitate the assembly of the torque measuring device on the shaft, a keeper 6 is provided rigidly interconnecting the flanges 7 and 9 on the torque rings 3 and 5. When the two halves of the torque measuring device are securely clamped to the shaft, the keeper 6 is then removed from each half and the device is ready for operation.

Referring now to Fig. 2 for a complete description of the invention, numerals 3 and 5 indicate axially split cylindrical members or torque rings axially spaced along the shaft 1 and clamped thereto on axially split insert or support rings 11 and 13 by means of the bolts 15, so that a known gauge length of shaft is included between the planes of the insert rings. These insert rings are chamfered on their inner and outer peripheral edges, so that a very short axial face length is had, thus keeping the clamping area on the shaft at a minimum. Annular recesses 16 provided internally of the torque rings 3 and 5 securely seat the torque rings on the chamfered peripheral edges of the support rings. Annular recesses turned in the axial faces of the support rings provide a thin web interconnecting the inner and outer edges of the rings. This web section provides axial flexibility of the support rings. Thus with the rings securely engaging the shaft and the recesses in the torque rings, axial movement of the torque rings relative to the shaft is provided.

As may be seen from the drawing, the axially confronting faces of the torque rings 3 and 5 are interconnected by means of the flat strip-like members 17 which may be termed radial vanes, and which form an important part of the construction. These vanes maintain the spacing of the torque rings and also provide stiffness against lateral bending of the torque rings or cylinder elements such as could occur from centrifugal force or misalignment of the parts during clamping on the shaft. For this purpose, the vanes must be at least four in number, and are preferably spaced at equal intervals about the circumference of the torque ring. Since the vanes are radial, they allow considerable torsional flexibility between the torque rings. When the shaft twists and the vanes bend, there is a tendency for the vanes to pull the torque rings together. If this shortening of the distance between the torque rings is greater than the normal shortening of the shaft due to twisting, it will be seen that an axial force will be applied to the insert rings 11 and 13 tending to move them from their clamped positions, thus destroying the accuracy of the gauge length. To avoid this difficulty, the above-described expedient of using axially flexible insert rings, allowing slight relative movement between the shaft and the torque rings, is provided.

The confronting axial faces of each of the torque rings are provided with axially extending portions or pads 18, 19, 20 and 21 to which the magnetic strain gauges 2 are secured. These axial pads are so positioned that they are in interlocking, but not touching, relation, so that twisting of the shaft will move the pads closer or farther apart depending upon the direction of the twist. As shown in the drawing (see Fig. 3), the pads 18 and 20 associated with the torque ring 3 are in diametrically opposite relation, and the pads 19 and 21 associated with the torque ring 5 are diametrically opposite.

The magnetic strain gauges 2 illustrated in the drawing each comprise a pair of E-shaped laminated iron core members 22 disposed in confronting relation; each of which has a coil 23 wound about the central leg thereof. The laminated iron armature 24 is disposed between the confronting faces of the core members so that small air gaps 25 and 26 are formed on each side thereof. Movement of the armature towards one core face will decrease the associated air gap while increasing the air gap associated with the opposite core member. Referring now to Figs. 3 and 4, the core members 22 of each magnetic strain gauge are shown supported in confronting relation on a non-magnetic rectangular frame 27. The armature is supported on a similar frame indicated by numeral 28. Frames 27 and 28 are connected together by the leaf springs 29 which allow relative motion between the frames in the direction only which increases one air gap while decreasing the other, and thus act as frictionless guides. The magnetic strain gauges bridge each pair of cooperating pads and are preferably mounted with the frames 27 secured to the diametrically opposite pads 19 and 21 which extend from the torque ring 5 and the frames 28 secured to the diametrically opposite pads 18 and 20 which extend from the torque ring 3. Thus relative angular displacement of the torque rings will, for example, assuming counterclockwise armature movement as viewed in Fig. 3, increase the air gaps 25 while decreasing the air gaps 26 and consequently change the impedances of the coils.

In Fig. 5, which is the schematic equivalent of the structure shown, the diametrically opposite coils of the strain gauges are shown connected in series circuit relation, and their leads are connected in a bridge circuit 30 through the medium of slip rings and brushes 31 on the shaft, so that each pair of the coils in series form one leg of the bridge circuit. The portions of the potentiometer 32 on each side of the slider form the other two legs of the bridge circuit. This bridge circuit is energized from a suitable source of alternating current. For no load of the shaft, the bridge circuit is adjusted to a balanced condition, by the potentiometer slider of potentiometer 32, and the meter 35 across the bridge to measure the unbalance thereof will not indicate an unbalance. If the shaft is twisted, however, due to torque, voltages in one pair of the coils in series will increase while voltages in the other pair will decrease depending upon the direction of the twist, thus unbalancing the bridge circuit and causing a voltage to appear across the terminals of the indicating meter indicative of the torque of the shaft.

The operation of the device depends upon the correct proportioning of the parts, particularly the radial vanes. Calculations of a device of the character disclosed for a four-inch diameter shaft indicate that it is feasible to obtain the features enumerated at the beginning of this disclosure without exceeding reasonable stresses, or depending upon a high coefficient of friction at the clamps.

The torque measuring device disclosed fulfills all the requirements set forth at the beginning of this disclosure:

(1) The radial vanes can deflect through the full motion of the torque rings without requiring enough force to slip the insert rings on the shaft.

(2) The vanes are proportioned and located to provide ample lateral rigidity.

(3) The torque measuring device can be assembled on the shaft without having access to the end thereof.

(4) The clamping length along the shaft is small compared to the gauge length. Without the radial vanes, it would be necessary to provide a much larger clamping length to get the necessary lateral rigidity.

The foregoing disclosure and the showings made in the drawings are merely illustrative of the principles of this invention and are not to be interpreted in a limiting sense. The only limitations are to be determined from the scope of the appended claims.

I claim as my invention:

1. Apparatus for continuously indicating the torque of a shaft comprising, in combination, a pair of axially spaced split-cylindrical members, a plurality of flat strips interconnecting each of the axially spaced halves of said split cylindrical members, said flat strips being resilient circumferentially of said split cylindrical members and substantially rigid radially of said members, axially split ring means for supporting said cylindrical members on said shaft when said cylindrical members are clamped about said shaft, said axially split ring means providing relative axial movement between said cylindrical members and said shaft thus compensating for relative movement between the shaft and said split cylindrical members upon torsional deflection of the shaft, said axially split cylindrical members being provided with axially extending sections in their axially confronting faces which sections are positioned in interlocking but not touching relation, at least one electromagnetic device comprising two coil and core assemblies and an armature disposed therebetween, said coil and core assemblies being attached to one of said axial sections associated with one of said split cylindrical members and said armature being attached to an axial section associated with the other axially split cylindrical member so that said armature is positioned in close proximity to said core assemblies, a source of alternating current for energizing said coils thus inducing a flow of alternating magnetic flux including said core assemblies and said armature, said axially spaced split cylindrical members being relatively angularly displaceable upon torsional deflection of said shaft thus moving said armature relative to said core assemblies and changing the values of a voltage in said coil means, and means for metering the voltage whereby the torque of said shaft is indicated.

2. Apparatus for continuously indicating the torque of a shaft comprising, in combination, a pair of axially displaced elements, torsionally resilient means interconnecting said elements providing freedom for relative angular displacement thereof and preventing relative tilting thereof, a plurality of axially split ring-like members having an annular recess turned in each face portion thereof thus providing thin axially resilient web-like portions interconnecting the inner and outer peripheries thereof, said axially resilient means supporting said elements on said shaft whereby said elements may move axially relative to said shaft thus compensating for unequal shortening of said shaft and said torsionally resilient means when said shaft is torsionally deflected, and means for measuring relative angular displacement of said elements upon torsional deflection of said shaft whereby the torque of said shaft is indicated.

3. In a torque sensitive electromagnetic device for a shaft having a pair of coaxially spaced elements and an electromagnetic pickup, supported by said elements, intermediate thereof, to respond to relative angular displacement of said elements, the combination of, an axially flexible ring-like element for supporting each of said elements on said shaft and a plurality of flat resilient strips interconnecting said elements and having the plane surfaces thereof radially disposed with reference to the longitudinal axis of said elements.

BERNARD F. LANGER.